(12) United States Patent
Weigel et al.

(10) Patent No.: US 6,212,334 B1
(45) Date of Patent: Apr. 3, 2001

(54) SUPPLEMENTARY OPTICAL SYSTEM FOR A CAMERA

(75) Inventors: Wolfgang Weigel, Ottobrunn (DE); Wolfgang Roessel, Atlantic Beach, NY (US)

(73) Assignee: Cine Photo Tech, Inc., Woodside, NY (US)

( * ) Notice: Subject to any disclaimer, the term of this patent is extended or adjusted under 35 U.S.C. 154(b) by 0 days.

(21) Appl. No.: 09/302,887

(22) Filed: Apr. 30, 1999

(30) Foreign Application Priority Data

May 2, 1998 (DE) .............................................. 198 27 018

(51) Int. Cl.[7] .......................... G03B 17/00; G02B 17/00; G02B 23/00
(52) U.S. Cl. ............................ 396/71; 359/434; 359/733
(58) Field of Search .................................. 396/71, 373, 432, 396/374; 359/434, 432, 733, 822; 352/142

(56) References Cited

U.S. PATENT DOCUMENTS

| | | |
|---|---|---|
| 1,871,165 | 8/1932 | Egy . |
| 2,293,598 | 8/1942 | Drucker .................................. 95/50 |
| 2,821,108 | 1/1958 | Warmisham et al. .................... 88/57 |
| 3,191,496 | 6/1965 | Cook ........................................ 88/57 |
| 3,437,748 | 4/1969 | Latady et al. ......................... 178/6.8 |
| 3,655,260 | 4/1972 | Bartucci et al. ........................ 350/45 |
| 3,994,572 | 11/1976 | Uesugi et al. ........................ 350/186 |
| 3,995,557 | 12/1976 | Engel et al. ............................. 102/79 |
| 4,000,501 | 12/1976 | Sakaguchi et al. ................... 354/197 |
| 4,104,649 | 8/1978 | Tanaka et al. ........................ 354/289 |
| 4,192,591 | * 3/1980 | Yobaccio ................................ 396/373 |
| 4,195,922 | * 4/1980 | Hajnal .................................... 396/432 |
| 4,235,541 | * 11/1980 | Jamel ..................................... 396/432 |
| 4,249,791 | 2/1981 | Helm et al. ............................ 350/16 |
| 4,375,913 | 3/1983 | Hajnal ..................................... 354/79 |
| 4,420,231 | * 12/1983 | Gottschalk .......................... 352/142 |
| 4,437,745 | 3/1984 | Hajnal .................................... 354/117 |
| 4,449,794 | 5/1984 | Yamada ................................. 350/472 |
| 4,580,886 | 4/1986 | Hajnal ..................................... 354/79 |
| 4,588,294 | 5/1986 | Siegmund ............................. 356/241 |
| 4,741,605 | 5/1988 | Alfredsson et al. .................. 350/422 |
| 4,862,199 | 8/1989 | Centkowski et al. .................. 354/62 |
| 4,867,549 | 9/1989 | Sekine ................................... 350/572 |
| 4,868,588 | 9/1989 | Hajnal ..................................... 354/79 |
| 4,963,910 | 10/1990 | Ishimura ............................... 354/400 |
| 4,984,886 | 1/1991 | Yoshida ................................. 356/237 |
| 5,117,246 | 5/1992 | Takahashi et al. .................... 354/202 |
| 5,189,560 | 2/1993 | Edwards et al. ...................... 359/744 |
| 5,191,475 | 3/1993 | Terasawa et al. ..................... 359/684 |
| 5,237,356 | 8/1993 | Ohtsuka ................................. 354/62 |
| 5,376,984 | * 12/1994 | Abe ........................................ 359/432 |
| 5,430,575 | 7/1995 | Sudarshan et al. ................... 359/434 |
| 5,459,511 | 10/1995 | Uehara et al. ........................ 348/335 |
| 5,469,236 | 11/1995 | Roessel ................................... 354/79 |
| 5,499,069 | 3/1996 | Griffith ................................. 354/152 |
| 5,557,458 | * 9/1996 | Itoh ........................................ 359/434 |
| 5,687,023 | * 11/1997 | Ohshita ................................. 359/432 |
| 5,727,236 | * 3/1998 | Frazier .................................... 396/71 |
| 5,848,308 | * 12/1998 | Kawamura ............................ 396/374 |

FOREIGN PATENT DOCUMENTS

| | | |
|---|---|---|
| 58-48011 | 3/1983 | (JP) . |
| 59-68725 | 4/1984 | (JP) . |
| 63-205626 | 8/1988 | (JP) . |

* cited by examiner

Primary Examiner—W. B. Perkey
(74) Attorney, Agent, or Firm—Brown & Wood, LLP

(57) ABSTRACT

A supplementary optical system for a camera which is inserted between a photographic lens and a camera housing and which comprises a relay system for projecting an image of the photographic lens onto a film or a video recording material, wherein the relay system produces more than one image and a zoom lens is disposed on the camera body. The supplementary optical system permits focusing and other camera controls to be operated near the camera housing. Additionally, this invention can be converted for performing different tasks in a simple manner due to the employment of path bending units.

20 Claims, 3 Drawing Sheets

SUPPLEMENTARY OPTICAL SYSTEM FOR A CAMERA

BACKGROUND OF THE INVENTION

1. Technical Field

The present invention relates to a supplementary optical system for a camera which is inserted between a photographic lens and a camera housing and which comprises a relay system for projecting an image of the photographic lens onto film or a video recording medium.

2. Background Information

A supplementary optical system is known from European Patent A-0 690 327. Such systems may be used with still cameras, film cameras, or video cameras. Additional supplementary optical systems of the general type are known from U.S. Pat. Nos. 5,469,236 and 4,867,549. Explicit reference is made to these documents for an explanation of all the features which are not described in detail in this application.

All of the known supplementary optical systems have the feature in common that the normal camera lens, which is directly located on the camera housing, is attached to the supplementary system so that it presents a more or less wide spacing from the camera housing, depending on the design of the supplementary system. Especially when the camera lens is a variable power or zoom lens, this feature renders the operation more difficult for the operator because the controls for focal length adjustment and for operation of other camera elements are spaced at a comparatively wide distance from the camera housing.

It is moreover inexpedient in the known systems in that they cannot be adapted to handle different tasks in a simple manner. For instance, it is not possible to simply use each of the known systems both as a straight system and as a bent system after simple conversion.

The subject invention is now based on the problem to improve a supplementary optical system for a camera in such a way that handling will be facilitated and that the system can be converted for different tasks in a simple manner.

One inventive solution to this problem is defined in Patent claim 1. Improvements of the invention are the subject matters of claims 2 et seq. In accordance with the subject invention the relay system may be structured so that it produces more than one image and so that the lens disposed directly on the camera body is a zoom lens.

It is therefore not only possible to perform focusing and rotation of the image close to the camera, but moreover the image magnification can be selected. In particular, the zoom lens (as a lens with which focusing is varied when the focal length is varied) may be supplanted by a varifocal lens, i.e., a lens in which focusing is not varied when the focal length is varied.

Due to this configuration it is furthermore possible to convert the supplementary optical system of the present invention in a comparatively simple manner. It is possible in particular to select the object-to-lens distance between the image of the photographic lens and the first image to be so wide that further systems such as path-bending units may be accommodated in this zone.

It is particularly preferred that the path-bending unit be disposed between the photographic lens and the relay system because in such a case the optical system, which is arranged in the taking path ahead of the path-bending unit, is of a comparatively small and hence light-weight design.

In another configuration, the path-bending unit comprises two elements of which at least one bends the light path through 90 degrees. With this design in particular an offset of the optical axis can be achieved which enables the operator to manage complicated taking situations, such as those involved in macro photography, by means of the inventive supplementary system of the present invention.

One of these elements may be a front-surface mirror whereas the other element may be a path-bending element with image reversion so that a non-reversed image is obtained with an intermediate image.

The aforementioned design permits not only an offset of the optical axis but also a tilt of the offset optical axis. To this end an element can be rotated together with the photographic lens in such a way that the respective swing angle of the photographic lens amounts to twice the magnitude of the swing angle of the tilting element. The tilting element may be the front-surface mirror in particular.

In a preferred embodiment of the present invention the relay system includes three lenses and the zoom lens, with a prism being disposed for image rotation between the first and the second lenses. The two lenses, which are arranged between the image rotation prism and the zoom lens, are preferably of a similar or equivalent design and preferably are disposed in symmetry relative to the center plane therebetween.

The invention will be described in the following by exemplary embodiments, with reference to the drawings, but without implying any restriction of the general inventive idea. With respect to the disclosure of all inventive aspects which are not explained in more detail in the text, reference is explicitly made to the drawing as well.

DETAILED DESCRIPTION

Figure 1:
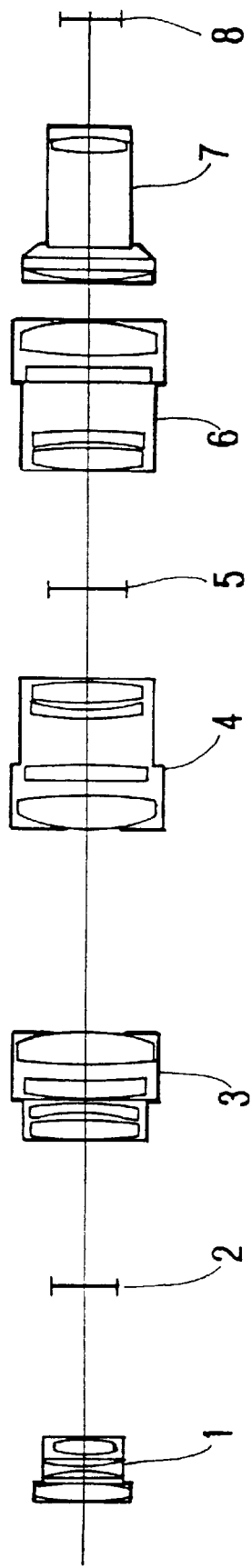
FIG. 1 illustrates the fundamental configuration of one embodiment.

FIG. 1 shows a first embodiment of the invention in which the relay system is configured so that it produces more than just one intermediate image.

To this end optical relay systems 3, 4, and 6 as well as an optical zoom unit 7 are arranged between an optical taking system 1 and an image plane 8 in which a film or a video recording material may be provided. The optical taking system 1 produce an image in a first intermediate plane 2. This image is projected in the second intermediate image plane 5 by the first relay system which consists of the optical relay systems 3 and 4 in tandem. The image produced in this image plane is projected into the film or video recording plane 8 by the second relay system which consists of the optical relay system 6 with an invariable focal length and zoom lens 7. The zoom lens permits a setting of the image section without the operator being required to operate a taking lens which is spaced by a wide distance due to the relay system.

Figure 2:
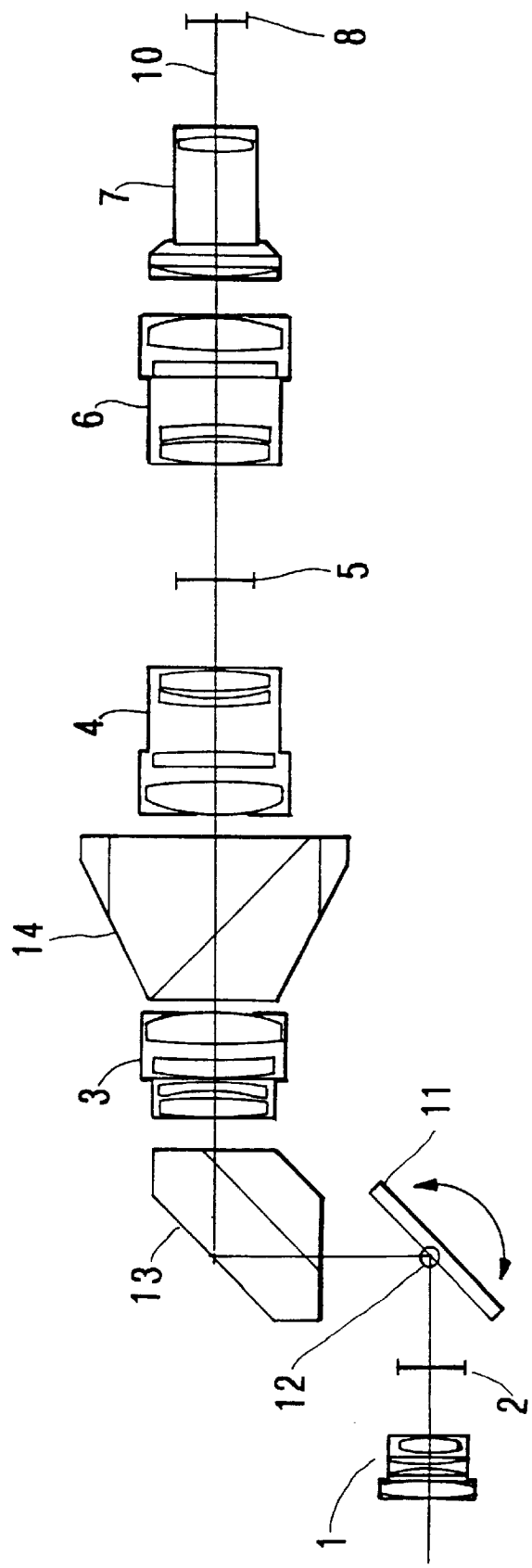
FIG. 2 shows a modification of the embodiment illustrated in FIG. 1, showing the offset of the optical axis of the photographic lens and the relay system.

FIG. 2 shows a second embodiment in which the same elements as those shown in FIG. 1 are provided with the same reference numerals so that a repeated description will be dispensed with here.

In these embodiments elements are provided between the first intermediate image plane 2 and the first relay system, which consists of the optical relay units 3 and 4, which elements offset an optical axis 9 of the optical taking system 1 relative to an optical axis 10 shared in common by the optical systems 3, 4, 6 and 7. These elements include a front-surface mirror 11 which may be tilted about an axis 12 normal on the optical axis 9, and a roof prism 13 with image reversion.

Moreover, a prism 14 is disposed between the optical relay system 3 and 4 for image rotation.

The optical taking system 1 may be tilted together with the front-surface mirror 11 in such a way that the respective swing angle of the optical taking system 1 is twice as wide as the swing angle of the front-surface mirror 11 about the axis 12.

Figure 3:
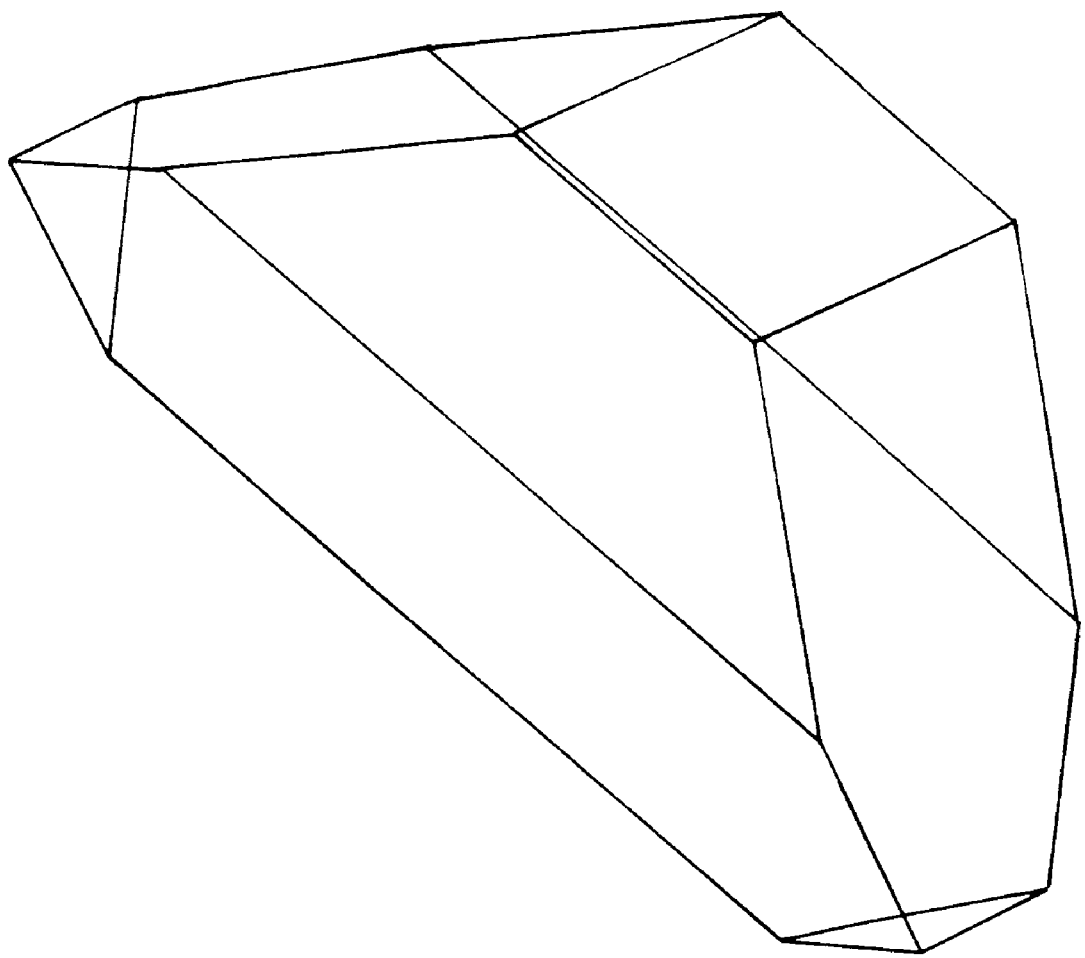
FIG. 3 is a view of a roof prism as used in the invention.

FIG. 3 shows an embodiment of the roof prism 13.

What is claimed is:

1. A supplementary optical system for a camera having a camera housing, comprising a photographic lens as an optical taking system, an optical relay system with a zoom lens being disposed on said camera housing, which are arranged in that order along an optical path, for projecting a final image of said photographic lens onto a film, and wherein said photographic lens and said optical relay system produce more than one intermediate image.

2. The supplementary optical system according to claim 1, wherein a path-bending unit is arranged between said photographic lens and said relay system.

3. The supplementary optical system according to claim 2, wherein said path-bending unit comprises two elements, one of said two elements bending said optical path through 90 degrees.

4. The supplementary optical system according to claim 3, wherein one of said two elements is tiltable together with said photographic lens such that a respective swing angle of said photographic lens is twice the magnitude of a swing angle of said tiltable element.

5. The supplementary optical system according to claim 4, wherein said tiltable element is a front-surface mirror.

6. The supplementary optical system according to claim 5, wherein said relay system comprises first, second, and third lenses, and a zoom lens, a prism being disposed between said first and second lenses for image rotation; and wherein said second and third lenses provide a similar or equivalent design and are disposed in symmetry relative to the center-plane between them.

7. The supplementary optical system according to claim 3, wherein one of said two elements is a front-surface mirror and the other of said two elements is a path-bending element having image reversion.

8. The supplementary optical system according to claim 7, wherein one of said two elements is tiltable together with said photographic lens such that a respective swing angle of said photographic lens is twice the magnitude of a swing angle of the tiltable element.

9. The supplementary optical system according to claim 8, wherein said tiltable element is a front-surface mirror.

10. The supplementary optical system according to claim 9, wherein said relay system comprises first, second, and third lenses, and a zoom lens, a prism being disposed between said first and second lenses for image rotation; and wherein the second and third lenses provide a similar or equivalent design and are disposed in symmetry relative to a center-plane between them.

11. The supplementary optical system according to claim 7, wherein said path-bending element having image reversion is a roof-type system.

12. The supplementary optical system according to claim 11, wherein one of said two elements is tiltable together with said photographic lens such that a respective swing angle of said photographic lens is twice the magnitude of a swing angle of the tiltable element.

13. The supplementary optical system according to claim 12, wherein said tiltable element is a front-surface mirror.

14. The supplementary optical system according to claim 9, wherein said relay system comprises first, second, and third lenses, and a zoom lens, wherein a prism is disposed for image rotation between said first and second lenses; and wherein the second and third lenses provide a similar or equivalent design and are disposed in symmetry relative to the center-plane between them.

15. The supplementary optical system according to claim 1, wherein said relay system comprises first, second, and third lenses, and a zoom lens.

16. The supplementary optical system according to claim 15 wherein a prism is disposed between said first and second lenses for image rotation.

17. The supplementary optical system according to claim 15 wherein the second and third lenses provide a similar or equivalent design and are disposed in symmetry relative to a center-plane between them.

18. The supplementary optical system according to claim 16 wherein the second and third lenses present a similar or equivalent design and are disposed in symmetry relative to the center-plane between them.

19. The supplementary optical system according to claim 17 wherein the zoom lens is supplanted be a varifocal lens.

20. The supplementary optical system according to claim 18 wherein the zoom lens is supplanted by a varifocal lens.

* * * * *